United States Patent Office 3,417,246
Patented Dec. 17, 1968

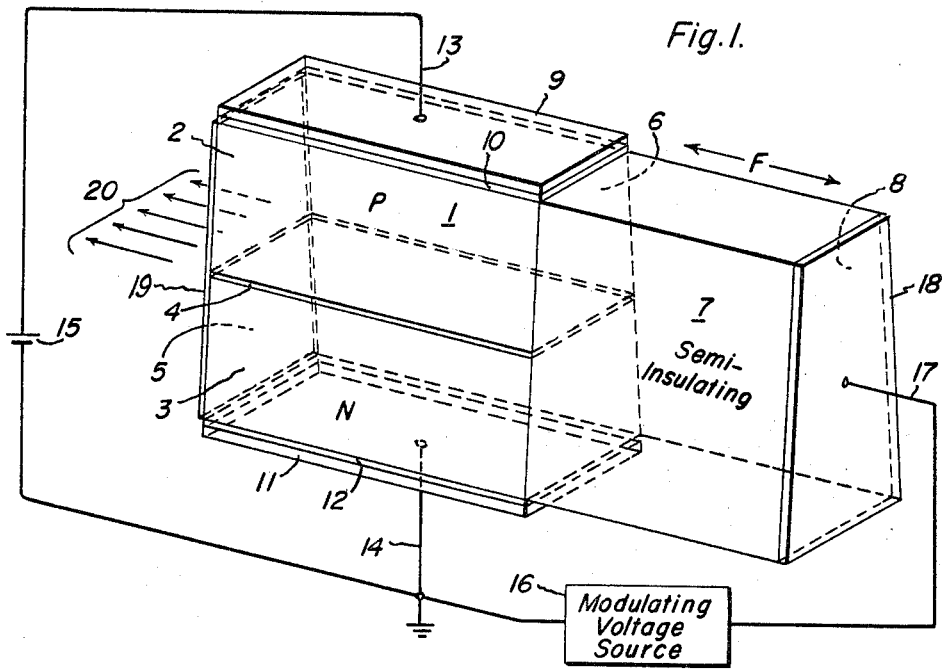
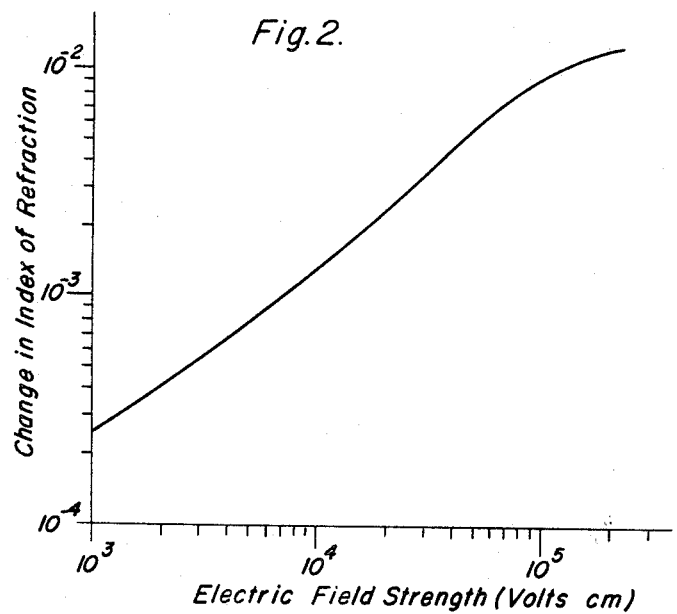

3,417,246
FREQUENCY MODULATED SEMICONDUCTOR JUNCTION LASER
Robert N. Hall, Schenectady, N.Y., assignor to General Electric Company, a corporation of New York
Filed July 26, 1965, Ser. No. 474,800
10 Claims. (Cl. 250—199)

ABSTRACT OF THE DISCLOSURE

A semiconductor junction laser diode and a body of semi-insulating semiconductor material are joined to form a resonant cavity wherein the resonant frequency is shifted by varying the refractive index of the semi-insulating material with intensity of an applied electric field. The field is applied parallel to the direction of light emission, with the laser diode surface at the interface forming a radio frequency ground plane for the field.

---

This invention relates to semiconductor junction lasers for providing coherent radiation falling within a very narrow band of the electromagnetic spectrum, and more particularly to a method and apparatus for modulating the output frequency of such lasers.

Semiconductor diodes adapted to provide emission of stimulated coherent radiation are described in an article entitled "Coherent Light Emission From P-N Junctions," appearing in Solid-State Electronics, vol. 6, page 405 (1963), intended to be incorporated herein by reference. Further detailed discussion of suitable materials, application techniques, and operation of such diode devices is found in my copending application, Ser. No. 345,884, now Patent No. 3,359,507 filed Feb. 19, 1964 and assigned to the assignee of the present invention. Diodes of this type are referred to herein as semiconductor junction laser diodes.

Discovery of the semiconductor junction laser has advanced the state of the laser art by facilitating greater efficiency in generating stimulated coherent electromagnetic radiation of, for example, visible and infrared light with less complex equipment. The usefulness of such devices may be greatly enhanced by modulating the output radiation produced therefrom in order to transmit intelligence. While amplitude modulation of junction lasers may readily be accomplished by varying the junction current, this modulation may be accompanied by temperature fluctuations and consequent frequency distortion. Frequency modulation, however, can be accomplished without such distortion. Moreover, frequency modulation is more advantageous for laser communication, because it permits more advantageous use of the wide bandwidth available at laser operating frequencies.

The present invention provides a method and apparatus for efficiently varying the coherent output frequency produced by a junction laser diode in accordance with variations in magnitude of a modulating voltage. Such frequency modulation of coherent light may, for example, permit transmission of useful information by means of light beams; the term "light," as used herein, being intended to include all electromagnetic radiation between the wavelengths of approximately 0.3 and 20 microns. Intensity of the coherent radiation provided by the laser remains undisturbed by the frequency modulating voltage.

Accordingly, one object of this invention is to provide a method and apparatus for frequency modulating a semiconductor junction laser.

Another object is to provide a semiconductor junction laser having a coherent radiation output frequency which is variable in accordance with magnitude variations of a high frequency voltage.

Another object is to provide a semiconductor junction laser capable of being frequency modulated with a voltage of extremely high modulation frequency without use of appreciable modulation power.

Another object is to provide a semiconductor junction laser including a radiation-conducting medium having an index of refraction which is variable in accordance with the strength of an applied electric field.

Briefly, in accordance with one aspect of the invention, a semiconductor junction laser diode is placed in optical contact with a body of semi-insulating semiconductive material. As used herein, the term "optical contact" defines the condition whereby light may pass from one material to another, either without passing through any intervening medium at all, or passing through an intervening medium of insufficient thickness to produce any appreciable reflection. The term "semi-insulating semiconductive material" defines a wide band gap semiconductor, such as gallium arsenide in its intrinsic or nearly intrinsic form, which displays a resistivity greater than $10^6$ ohm-centimeters at room temperature.

A source of constant forward bias current in excess of the threshold value required for coherent light emission from the laser diode is coupled to the opposite conductivity portions of the diode. A source of modulating voltage is connected to the body of semi-insulating semiconductive material in order to induce an electric field therein. Because the opposed exterior surfaces of the laser diode and semi-insulating semiconductive material are polished and coated with suitable reflecting or partly reflecting coatings so that the surface of the semi-insulating material is highly internally reflective and the surface of the laser diode is partially internally reflective and partially transparent, coherent light is produced. By varying the voltage amplitude of the modulating source, the index of refraction of the semi-insulating material is changed accordingly. In this fashion, the velocity of the incident and reflected coherent radiation within the semi-insulating material is altered, thereby producing corresponding changes in the output frequency of the device. Moreover, because the semi-insulating semi-conductive material presents an extremely high impedance to the source of modulating voltage, effective modulation may be achieved without consuming appreciable power from the modulating source.

The features of the invention believed to be novel are set forth with particularity in the appended claims. The invention itself, however, both as to organization and method of operation, together with further objects and advantages thereof, may best be understood by reference to the following description taken in connection with the accompanying drawings in which:

FIGURE 1 is a schematic and perspective view of one embodiment of the invention; and FIGURE 2 is a curve illustrating typical electric field dependence of the refractive index for the semiconductive semi-insulating body of material shown in FIGURE 1.

In the drawings, FIGURE 1 shows a semiconductor junction laser diode 1 comprising a monocrystalline body of direct transition semiconductive material having a degenerate P-type conductivity region 2 and a degenerate N-type conductivity region 3. The P-type and N-type conductivity regions are separated by an intermediate narrow P-N junction region 4 extending linearly in at least one direction perpendicular to an external surface 5 of laser 1. The P-N junction is preferably of planar configuration, and hence the plane of the junction is perpendicular to surface 5.

A body of semi-insulating semiconductive material 7, in the form of a six-sided block, is situated in optical and electrical contact with surface 6 of laser diode 1, which is opposite surface 5 of the laser diode. An outer surface 8 of semi-insulating block 7, comprising a highly reflective, polished surface, is situated parallel to external surface 5 of laser diode 1, and hence is perpendicular to the plane of junction 4, although the junction terminates at surface 6. External surface 5 of laser diode 1 is coated with a material 19 rendering the surface partially reflecting and partially transparent, in order to allow some radiation to pass therethrough. The interface between laser diode 1 and semi-insulating block 7 is essentially non-reflecting, although it is possible to have some degree of reflectivity present at the interface, if desired. Reflecting surfaces 5 and 8 thus define an optically resonant cavity in which standing waves may be generated.

Nonrectifying contact is made between the P-type region 2 of laser diode 1 and a first electrode 9 by means of an acceptor type, or electrically neutral, solder layer 10, and a nonrectifying connection is made between N-type region 3 of laser diode 1 and a second electrode 11 by means of a donor type, or electrically neutral, solder layer 12. Conductors 13 and 14 are connected to first and second electrodes 9 and 11, respectively, by, for example, welding, brazing, etc. Conductors 13 and 14 are connected to opposite sides of a source of bias current 15. A source of high frequency modulating voltage 16, capable of producing an output voltage at frequencies ranging up to and beyond 1000 megacycles, is connected to a conductor 17, and nonrectifying contact is made between block 7 of semi-insulating semiconductive material and conductor 17 means of an evaporated metal contact or electrode 18 applied to reflecting surface 8. Conductor 17 is joined to electrode 18 by, for example, welding, brazing, etc. Conductor 14 is grounded. Opposed surfaces 5 and 8 of laser diode 1 and semi-insulating semiconductive material 7, respectively, are ground and polished to parallelism with extreme accuracy in order that a standing wave pattern may be readily established within the plane of junction 4 for efficiently emitting coherent electromagnetic radiation.

Semi-insulating block 7 may be an independent semi-conductive body joined to laser diode 1 by pressing their respective adjoining surfaces into optical contact in a suitable jig, which may include two flat glass plates biased to sandwich blocks 1 and 7 together. Alternatively, semi-insulating block 7 may be fabricated by epitaxial deposition onto surface 6 of laser diode 1 of a semi-insulating form of the semiconductive material from which laser diode 1 is fabricated, thereby retaining crystalline integrity. In the latter case, block 7 and laser diode 1 each comprise regions of the same monocrystalline body of semiconductive material.

The semiconductive material of which laser diode 1 is fabricated comprises, in general, a compound semiconductor or an alloy of compound semiconductors from the Group III–V of the Periodic Table which are denominated as direct transition semiconductors; that is, semiconductors characterized by direct transitions of electrons between valence and conduction bands. These semiconductors may include, for example, gallium arsenide, indium antimonide, indium arsenide, indium phosphide, gallium antimondide, and alloys therebetween. These semiconductors may also include direct transition alloys of other materials such as alloys of gallium arsenide and gallium phosphide (which is indirect by itself) in the range of up to 40 atomic percent of gallium phosphide. A further discussion of direct transition semiconductors appears in an article by H. Ehrenreich in The Journal of Applied Physics, vol. 32, page 2155 (1961).

The materials suitable for rendering degenerate the various N-type and P-type semiconductors with which the devices of the present invention may be constructed depend upon the semiconductive material utilized, and are not necessarily the same in each case. Thus, all of the Group III–V Periodic Table compounds utilize sulfur, selenium and tellurium as donors and zinc, cadmium, mercury and magnesium as acceptors. On the other hand, the elements tin, germanium and silicon may serve either as donors or acceptors depending upon the particular semiconductor and the method of operation. For example, in gallium antimonide grown from a stoichiometric melt, tin, germanium and silicon are all acceptors. In indium antimonide, tin is a donor, whereas germanium and silicon are acceptors. In the remaining direct transition semiconductors of the Group III–V type, tin, germanium and silicon are all donors.

Other suitable direct transition semiconductive materials include lead sulphide, lead selenide and lead telluride. In these materials, indium is suitable as a donor and excess anions are suitable acceptors. Any donor and acceptor pair that have sufficiently high solubilities for the material utilized to form crystal 1 may be utilized to form the degenerately impregnated or doped regions 2 and 3 of the crystal. The ensuing discussion assumes that the junction laser diode and semiconductive semi-insulating block are comprised of gallium arsenide.

Monocrystalline semiconductive body 1 is adapted to produce stimulated coherent emission by providing therein a very thin P-N junction region 4, having a thickness of from 300 to 20,000 angstrom units, preferably between 500 and 2000 angstrom units, with conductivity characteristics intermediate the conductivity characteristics of regions 2 and 3. Monocrystalline body 1 comprises a degenerately impregnated, or doped, P-type region 2 and a degenerately impregnated, or doped, N-type region 3. A semiconductive body is considered to be degenerate P-type when it contains a sufficient concentration of excess acceptor impurity carriers to depress the Fermi level to an energy lower than the maximum energy of the valence band on the energy band diagram for the semiconductive material. Similarly, a body is considered to be degenerate N-type when it contains a sufficient concentration of excess donor impurity carriers to raise the Fermi level thereof to a value of energy higher than the minimum energy of the conduction band on the energy band diagram of the semiconductive material. Degeneracy is initially obtained, in the case of gallium arsenide, when the excess positive conduction carrier concentration exceeds $10^{18}$ per cubic centimeter or when the excess negative conduction carrier concentration exceeds $10^{17}$ per cubic centimeter. The Fermi level may be defined as the energy at which the probability of there being an electron present in a particular state is 50 percent.

In operation, a constant bias current in excess of the threshold value, or value required to produce self-excited oscillation, is supplied from direct current source 15 through laser diode electrodes 9 and 11, so that coherent light is produced and is radiated out of partially reflecting face 5 in a direction indicated by rays 20 at a frequency determined by the separation between face 5 and mirror surface 8 and by the refractive indices of the two gallium arsenide regions therebetween. The bias current serves to "pump" the laser; that is, to excite electrons from their ground states to a higher energy level at a sufficiently rapid rate whereby most of the electrons almost completely fill the higher level, thereby achieving a condition known as a "popular inversion." This condition is a prerequisite for laser action, since it permits stimulated emission of light to predominate over absorption thereof. To avoid overheating the diode, it may be convenient to subject the diode to a low temperature in order to lower the threshold for coherent emission and preclude the necessity of a high current source. Thus, if gallium arsenide diode 1 is immersed in a Dewar of liquid air at a temperature of 77° K., the threshold for coherent emission occurs at approximately 1000 amperes per square centimeter, and continuous operation of the diode may thereupon be achieved.

Application of a modulating voltage from source 16 produces an electric field within semi-insulating region 7. The electric field changes the refractive index of the semi-insulating region, changing the velocity of light therein. This, in turn, changes the average velocity of light between surfaces 5 and 8, and the frequency of the laser radiation is altered accordingly. In this fashion, frequency modulation of the laser output is achieved without changing the physical dimensions of the structure. Because the P-type and N-type portions of the laser comprise a highly conducting material, laser diode surface 6 functions as a radio frequency ground plane so that the modulation field created within the semi-insulating gallium arsenide region is directed substantially plan parallel, and perpendicular to surfaces 5 and 8, as indicated by vectors F.

The apparatus herein described is capable of achieving frequency deviations of hundreds of thousands of megacycles at modulation frequencies of over 1000 megacycles. In particular, assuming equal thicknesses of the two gallium arsenide bodies 1 and 7, a field of 3000 volts per centimeter, created by a modulation voltage of 100 volts, is sufficient to produce a frequency deviation of 50,000 megacycles. Since the capacity of the semi-insulating region is less than $10^{-3}$ micromicrofarads, and since semi-insulating gallium arsenide is a good dielectric, frequency modulation at a rate of many thousands of megacycles is possible with this apparatus.

FIGURE 2 is a graphical illustration of the change in index of refraction of the semi-insulating semiconductive material 7 of FIGURE 1 with strength of the electric field F therein. In this instance, the semi-insulating semiconductive material is gallium arsenide, which has an index of refraction of approximately 3.5 in the absence of an electric field. Examination of this curve indicates that the change in index of refraction due to the strength of the applied electric field increases in a substantially linear fashion in the region where electric field strength varies between $10^3$ volts per centimeter and $10^5$ volts per centimeter. A pronounced electro-optical effect, such as that manifested by gallium arsenide and illustrated by the curve of FIGURE 2, is a necessary factor in successfully accomplishing frequency modulation of a semiconductor junction laser in the manner described, supra.

The index of refraction of a semiconductor material is closely related to the optical absorption edge thereof, in that near a strong absorption edge there is a rapid change in refractive index. Consequently, a shift in the absorption edge, accomplished by application of an electric field to the semiconductor, is accompanied by a change in the index of refraction. The change in index with the applied electric field is known as the Pockels effect, and is larger in gallium arsenide than in most other crystals because of the small effective mass of the gallium arsenide conduction band and because the effect is utilized at a wavelength very close to the gallium arsenide absorption edge. It is preferable that the modulator section be comprised of the same material comprising the semiconductor junction diode, since, by its proximity to the absorption edge, the laser radiation lies in the most sensitive region of the modulator. Moreover, the substantial identity of indices of refraction, even in the presence of the modulating field, allows transfer of light between the diode and the semi-insulating gallium arsenide with no appreciable reflection at their common interface.

As one example of how a device may be constructed in accordance with the present invention as illustrated in FIGURE 1, a flat wafer is cut from a monocrystalline ingot of N-type gallium arsenide, which is impregnated or doped with approximately $10^{18}$ atoms per cubic centimeter of tellurium by growth from a melt of gallium arsenide containing a concentration of approximately $3 \times 10^{18}$ atoms per cubic centimeter of tellurium in order to cause it to be degenerately N-type. A P-N junction region is formed in a horizontal plane by diffusing zinc into all surfaces of the wafer at a temperature of approximately 850° C. for approximately three hours using an evacuated sealed quartz tube containing the gallium arsenide wafer, 10 milligrams of zinc, and 10 milligrams of arsenic, thus producing a P-N junction region of approximately 1000 angstrom units in thickness at a distance of approximately 25 microns below all surfaces of the wafer. The wafer is then cut and ground to remove all except one such planar junction. As cut, the wafer typically may be .5 millimeter thick and .4 millimeter by .4 millimeter on its faces. A film of silver or aluminum 19 sufficiently thin to be partially reflective and partially transparent to light emitted from junction 4 is next evaporated onto surface 5 of diode 1. Alternatively, a dielectric reflector having these characteristics may be applied to surface 5 by evaporating thereon alternate dielectric layers of high and low indices of refraction.

A block of semi-insulating gallium arsenide, which is comprised of highly purified gallium arsenide containing a sufficeint concentration of deep-level impurities to eliminate the free electrons and holes, which concentration is in the order of $10^{16}$ atoms per cubic centimeter, is cut and ground to a cross section substantially identical to the cross section of the body containing the P-N junction. The polished faces of diode 1 and semi-insulating block 7 which are to be placed in contact, are pressed together in a jig. Surfaces 5 and 8 are likewise polished to optical smoothness and exact parallelism (in the case of gallium arsenide, to a parallelism of approximately ±0.1 micron). The remaining sides perpendicular to the plane of junction 4 are cut so as to form a tapered structure as one means of precluding any possibility of transverse standing waves within the device. A highly conductive and reflective metal such as silver, for example, is next evaporated onto surface 8 of semi-insulating block 7, and a conductor 17, connected to modulating voltage source 16, is attached directly thereto. Electrodes 9 and 11 are then applied to the P and N regions of diode 1 by means of an acceptor solder 10 comprising an alloy of three percent by weight of zinc and the remainder of indium, and by a donor solder 12 of tin, respectively. Electrodes 9 and 11 are connected to conductors 13 and 14, which in turn, are connected to direct current source 15. In addition, conductor 14 is grounded. At this juncture, the source of coherent emission is ready for operation.

Thus, there has been shown a method and apparatus for frequency modulating a semiconductor junction laser in accordance with magnitude variations of a high frequency voltage, without altering the physical dimensions of the structure. The laser consumes just enough modulation power to alter the index of refraction of a semi-insulating radiation-conducting medium adjacent the junction laser diode, thereby requiring only a low power modulation source.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letter Patent of the United States is:

1. Apparatus for frequency modulating a beam of coherent light comprising, an optically resonant cavity for generating standing waves, said cavity including a semiconductor junction laser diode and a monocrystalline body of semiconductive material in optical contact with said diode, said body having a variable index of refraction, means communicating with said diode for stimulating coherent light emission therefrom, and means communicating with said body for controllably varying the index of refraction of said body.

2. Apparatus for frequency modulating a beam of coherent light comprising, an optically resonant cavity for generating standing waves, said cavity including a semiconductor junction laser diode and a monocrystalline body of semiconductive material in optical contact with said diode, said body having a variable index of refraction, circuit means forward biasing said diode with sufficient current to stimulate coherent light emission therefrom, and means communicating with said body for controllably varying the index of refraction of said body.

3. Apparatus for frequency modulating a beam of coherent light comprising, an optically resonant cavity for generating standing waves, said cavity including a semiconductor junction laser diode and a monocrystalline body of semi-insulating semiconductive material in optical contact with said diode, said body having a variable index of refraction, circuit means forward biasing said diode with sufficient current to stimulate coherent light emission therefrom, and additional circuit means coupling a high frequency voltage to said body for controllably varying the index of refraction of said body.

4. A frequency modulated coherent light source comprising, a semiconductor junction laser diode including a planar P-N junction, a monocrystalline body of semiconductive material joined to said diode and in optical contact therewith, said diode and said monocrystalline body each having a surface perpendicular to the plane of the junction in said diode, one of said surfaces being partially reflective and partially transparent to light produced by said source, the other of said surfaces being highly reflective to light produced by said source, means coupling sufficient forward bias current to said diode to stimulate coherent light emission therefrom, and means controllably coupling a high frequency voltage to said monocrystalline body to vary the index of refraction thereof.

5. A frequency modulated coherent light source comprising, a semiconductor junction laser diode including a P-N junction, a monocrystalline body of semiconductive material joined to said diode and in optical contact therewith, said diode and said monocrystalline body each having a surface perpendicular to the plane of the junction in said diode, one of said surfaces being partially reflective and partially transparent to light produced by said diode, the other of said surfaces being highly reflective to light produced by said diode, means communicating with said diode for stimulating coherent light emission therefrom, and means communicating with said monocrystalline body to vary the index of refraction thereof.

6. A frequency modulated coherent light source comprising, a semiconductor junction laser diode including a planar P-N junction, a monocrystalline body of semiconductive material joined to said diode and in optical contact therewith, said diode having one surface partially reflective and partially transparent to light produced by said diode and situated perpendicular to the plane of the junction, said monocrystalline body of semiconductive material having a surface parallel to said one surface and being highly reflective to light produced by said diode, means communicating with said diode for stimulating coherent light emission therefrom, and means communicating with said monocrystalline body of semiconductive material to vary the index of refraction thereof.

7. A frequency modulated coherent light source comprising:
a first monocrystalline body of direct transition semiconductive material having degenerate P-type and N-type conductivity regions separated by an intermediate narrow P-N junction region extending linearly in at least one direction between opposed first and second surfaces of said body, said first surface being perpendicular to said junction and partially internally reflecting and partially transparent;

a second monocrystalline body of semi-insulating semiconductive material having a first surface in optical and electrical contact with the second surface of said first monocrystalline body and having a second highly internally reflecting surface parallel to the first surface of said first body;

means communicating with said first monocrystalline body to stimulate coherent light emission from said junction; and means communicating with said second monocrystalline body to produce an electric field therein directed substantially plane parallel and perpendicular to the second surface of said second monocrystalline body whereby the index of refraction within said second monocrystalline body and the frequency of said emitted light vary in accordance with changes in strength of the electric field.

8. The frequency modulated coherent light source of claim 7 wherein said first and second monocrystalline bodies are each comprised of gallium arsenide.

9. A frequency modulated coherent light source comprising: a monocrystalline body having a pair of opposed parallel surfaces, one of said surfaces being partially transparent and partially internally reflecting and the other of said surfaces being highly internally reflecting, said body between said surfaces comprising first and second portions of semiconductive material, the first portion comprising semi-insulating semiconductive material and the second portion comprising a first region having degenerate N-type conductivity characteristics, a second region having degenerate P-type conductivity characteristics, and a P-N junction situated between said first and second regions extending in a direction perpendicular to said first and second surfaces; means communicating with the P-type and N-type regions of said second portion for stimulating light emission therefrom; and means communicating with said first portion to vary the index of refraction thereof.

10. The frequency modulated coherent light source of claim 9 wherein said means communicating with said first portion to vary the index of refraction thereof is coupled to one of said reflecting surfaces.

References Cited

UNITED STATES PATENTS

| 3,059,117 | 10/1962 | Boyle et al. | 250—199 X |
| 3,229,223 | 1/1966 | Miller | 250—199 X |
| 3,243,722 | 3/1966 | Billings | 250—199 X |
| 3,245,002 | 4/1966 | Hall. | |
| 3,256,443 | 6/1966 | Moore | 250—199 |
| 3,305,685 | 2/1967 | Wang | 250—199 |

ROBERT L. GRIFFIN, *Primary Examiner.*

A. MAYER, *Assistant Examiner.*

U.S. Cl. X.R.

331—94.5; 332—7.51